Sheet 1, 2 Sheets.
J. T. Gilmore.
Dressing Millstones.
No. 3,279. Reissued Feb. 2, 1869.
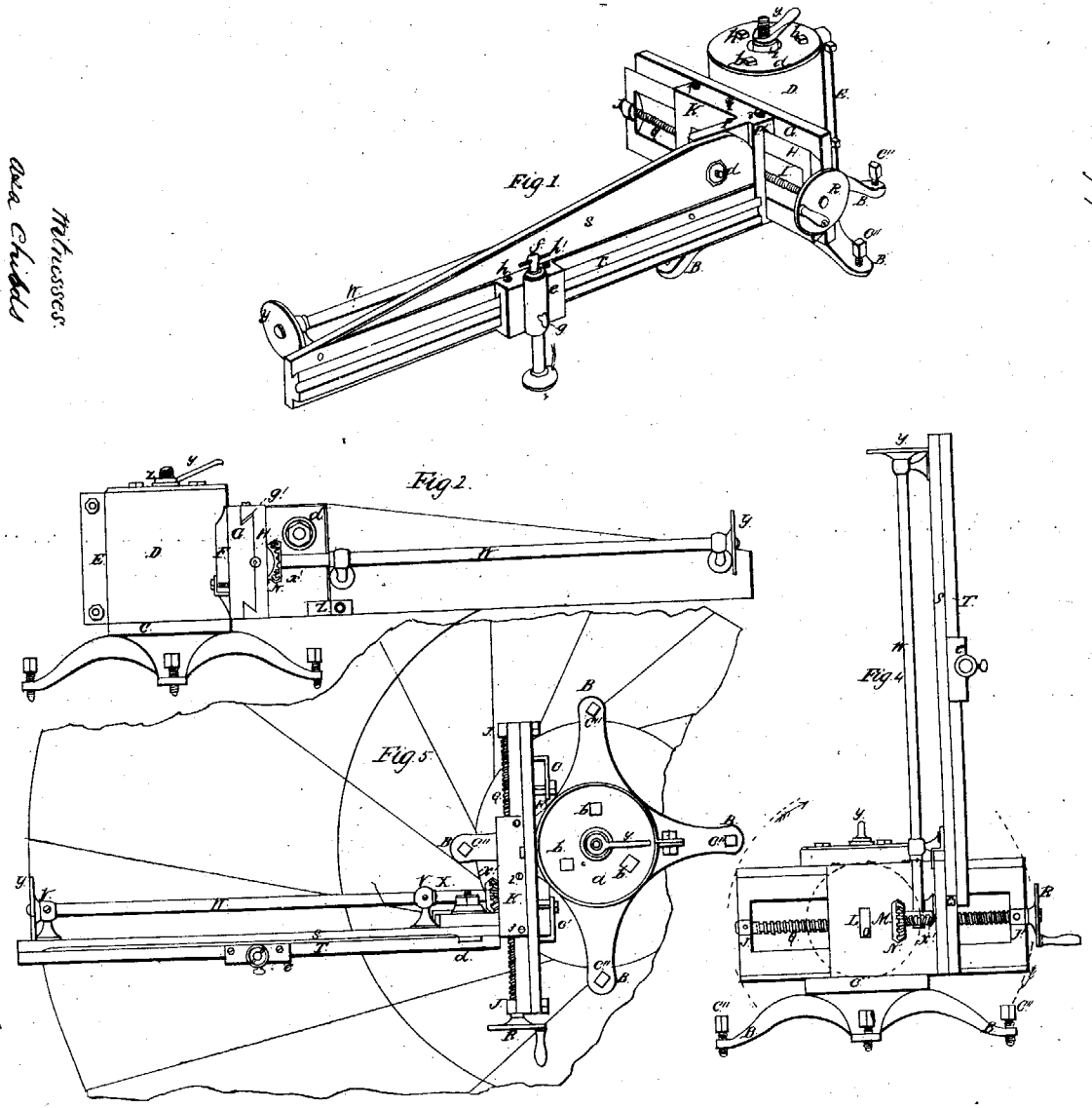
Witnesses.
Asa Childs
J. F. Single
Inventor
James T. Gilmore Sheet 2, 2 Sheets
J. T. Gilmore.
Dressing Millstones.
No. 3,279. Reissued Feb. 2, 1869.
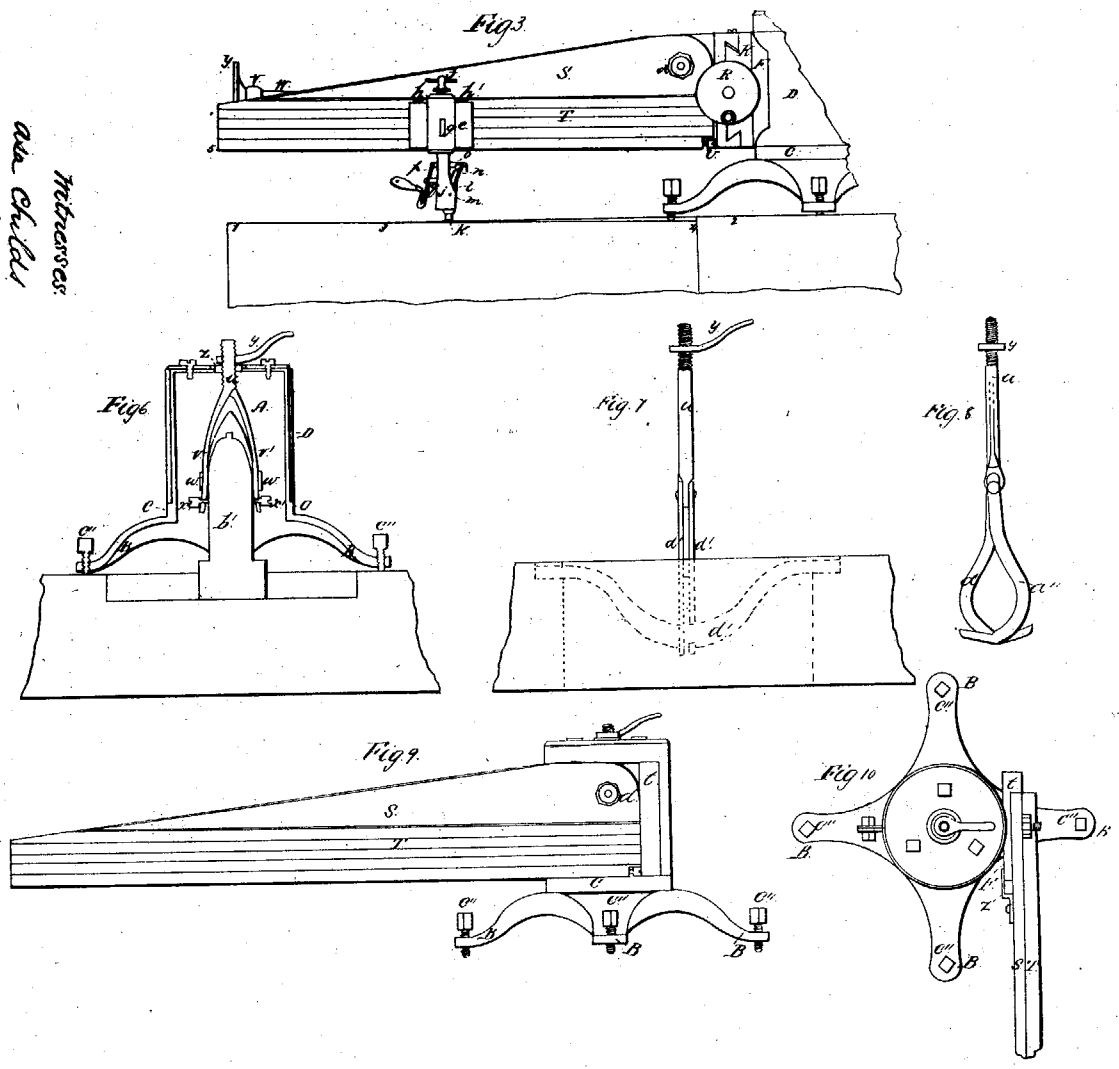
Witnesses.
Asa Childs
J. H. Seigler
Inventor
James T. Gilmore

UNITED STATES PATENT OFFICE.

LEONARD ANDERSON, OF PAINESVILLE, OHIO, ASSIGNEE OF JAMES T. GILMORE, OF SAME PLACE.

IMPROVED MACHINE FOR TRAMMING, STAFFING, AND FINE-DRESSING OF MILLSTONES.

Specification forming part of Letters Patent No. 36,776, dated October 28, 1862; Reissue No. 3,279, dated February 2, 1869.

*To all whom it may concern:*

Be it known that JAMES T. GILMORE, of Painesville, in the county of Lake and State of Ohio, have invented a new and useful Improvement in Machines for Tramming, Staffing, and Fine-Dressing of Millstones; and that I, LEONARD ANDERSON, of the same place, assignee of the said JAMES T. GILMORE, do hereby declare that the following is a full, clear, and exact description thereof, which will enable those skilled in the art to make and use the same, reference being had to the accompanying drawings, forming part of this specification, in which—

Figure 1 is a view in perspective of the improved machine; Fig. 2, an elevation of one side of the machine; Fig. 3, a partial elevation of its opposite side; Fig. 4, a front elevation with the arm turned up; Fig. 5, a plan view; Figs. 6, 7, and 8, exhibit the apparatus for securing the machine to the bed and runner stones, Fig. 6 being a central section; Figs. 9 and 10, side and plan views showing the arrangement of the machine when not required for the parallel movement, as will be explained.

Similar letters of reference indicate corresponding parts.

The object of my improvements is the embodying, in one and the same machine, an arrangement of parts, by which the various operations of tramming, staffing, and fine-cracking, and laying out the principal and subordinate furrows on the surface of millstones can be done with great accuracy, ease, and dispatch, the said parts possessing the quality of accurate adjustability so as to insure the certainty of the various operations mentioned.

To enable others skilled in the art to make and use my invention, I will proceed to describe its construction and operation.

A, Fig. 6, is an upright hollow cast-iron journal with four branching feet, B, as seen in Fig. 5. The upper portion of said journal is thinner, which leaves a shoulder, C, Fig. 6, around its base. Said journal is closed at the top, which is perforated with a central and three other holes. The extremities of the feet are provided with set-screws C′, Fig. 5.

D, Fig. 2, is a sleeve, also of cast-iron. Said sleeve is provided with a double flange, E, Fig. 5, through which tightening-bolts are put. On the side opposite said flange is a circular plate, F. (Shown by the dotted lines in Fig. 4.) Said sleeve, with the flange and plate, is formed of one casting. The flange E, after the inside is turned true, is cut through longitudinally, forming a double flange, as before mentioned. From the center of the circular plate F projects a pin, (not seen,) on which to pivot a cross-plate, G. The form of this plate will be seen by reference to Fig. 1.

H, Fig. 1, is a dovetailed guide running the whole length of the said plate.

I is a hollow circular recess. This, with the bearings J and J′, Fig. 4, are cast in one piece.

K, Fig. 1, is a dovetailed slide fitting on the dovetailed guide H.

L and M, Fig. 4, are openings through said slide K, which allow a small beveled geared wheel, N, and a nut, O, to come through. Said slide has also a flange, P, Fig. 1, projecting at right angles from its outside face, and is cast on it, leaving a space, P′, as shown. The upper part of the said slide is pierced with three screw-holes for set-screws 1, 2, and 3, Fig. 5.

Q, Fig. 4, is a long screw supported on the bearings J and J′. On said screw are placed the beveled geared wheel N and the nut O, before mentioned. On the right-hand end of said screw Q is fixed a crank-plate, R, as seen in Fig. 4.

S, Fig. 1, is an arm and is bolted through the flange P so that it can be turned up, as will be hereinafter explained.

T is a dovetailed guide cast on said arm, and is formed as shown in Fig. 1. The lower corner of said arm, at the end next to the slide K, is notched out to admit a set-screw, U, Fig. 3. On the back of said arm are fixed two supports, V and V′, Fig. 5, through which is inserted a long shaft, W, and is secured by a collar, X. At the end of the said shaft is a small beveled geared wheel, N, the other end being provided with a crank-plate, Y.

Z, Fig. 2, is a clip bolted to the lower part of the said arm, as shown in Fig. 2.

*a*, Fig. 5, is a cap-plate fitted to the top of the hollow journal A, Fig. 6, to which it is secured by screw-bolts *b*.

The above-described parts are put together as follows: The sleeve D, Fig. 2, is put around the hollow journal A and secured thereto by the plate *a* and screw-bolts *b*, the screw-bolts of the double flange being turned just enough to hold the sleeve snugly to the journal on which it turns. The dovetailed slide K is now put on the cross-plate G, which plate is pivoted to the circular plate F of sleeve D and secured thereto by two clips, *c* and *c'*, Fig. 5, so that said plate will turn on the central pivot of said circular plate. The long arm S is now secured to the flange P by the bolt *d*, the beveled geared wheel X' meshing into the other wheel, N.

I will now proceed to describe the construction and putting together the device for holding the staffing-block, tramming-quill, and diamond for fine-cracking.

*e*, Fig. 1, is a dovetailed slide having a hollow socket, into which on the top is inserted a set-screw, *f*, and on the side a tightening-screw, *g*. Said slide is secured on the dovetailed guide of arm S by means of set-screws *h* and *h'*. To aid the close fitting of said slide to the guide a gib or thin piece of metal, as seen in Fig. 2 and marked *g'*, is placed between the upper dovetailed surfaces.

The staffing-block *i*, Fig. 1, is a small circular head about two inches in diameter and is attached to a short shaft, which is inserted into the socket of slide *e*, as seen in Fig. 1.

The mechanical device for using a cracking-diamond is fully delineated in Fig. 3.

*j* is a stock fitting into the socket of slide *e*.

*k* is a diamond, secured in a handle, *l*, said handle being pivoted to the stock *j* at *m*. A flat spring, *n*, is secured in said stock, impinging on the upper part of the diamond-handle, as shown. A hooked finger, O, passes through a hole in said stock and catches on the top of the diamond-handle. The opposite end of the said hooked finger is pivoted to a short lever, *p*, which has its fulcrum on a bearing, *q*, projecting from said stock. The lever is turned back from its bottom, as shown, and the end furnished with a convenient handle, *r*.

Figs. 9 and 10—one being a side elevation and the other a plan view—represent the machine as fitted without the mechanism for the parallel movement of the arm, (as hereinafter explained,) the long arm S being pivoted to the circular plate E, on which is cast a shoulder, *t*.

The devices for securing the above-described machine to the millstones are constructed and arranged as follows:

*u*, Fig. 6, is a stem or shaft having a screw-thread cut on its top. The lower part branches into two straps, *v* and *v'*. *w* is a collar or hoop, and *x x'* tight screws passing through holes in the lower part of said branching-straps.

*y* is a lever-nut, and *z* a washer.

This is the arrangement for fastening the machine to the bed-stone. For the runner-stone grappling-arms *a'* and *a''*, pivoted to the shaft *u*, (which is somewhat lengthened for the purpose,) are used.

To put the above-described machine into operation the first thing is to secure it to the stone. For the bed-stone the branched-strap arrangement is used. These are placed on the spindle *b'*, Fig. 6, and the collar *w* driven on. The screws *x x'* are then turned, causing them to impinge on the side of the spindle and to keep the branched straps firm and steady. For the runner-stone the grappling-arms are passed under the bail *d*, Fig. 7. The machine is now to be secured to the stone by allowing the shaft *u* to come through the hole on the top of the hollow journal, securing it, for the present somewhat loosely, by means of the lever-nut *y*. The body of the machine is then adjusted vertically to the general surface of the stone by moving the arm S at intervals on all parts of the surface, tramming it by means of the quill in the staffing-head, the slide *e* being moved back and forth on the guide. These movements are made in connection with the raising or depressing of the branching feet by means of the set-screws. When the machine is found to stand true as to the general surface of the stone, it is firmly secured in its position by tightening the lever-nut *y*. The machine is now ready for the operation of staffing. This is effected by moving the arm horizontally over the stone and operating the slide with the staffing-head back and forth, the face of said staffing-head being previously rubbed with the usual coloring.

The arm S can be turned up when necessary, as seen in Fig. 4, so that the staffing-head can be replenished with color without disturbing its fixed position.

One of the important operations in dressing millstones is the cutting or "cracking" fine lines or furrows on the "land" surfaces between the deep furrows, and a diamond is now often employed for this purpose.

The arrangement of a stock provided with the mechanism, as described, inserted into the socket of the slide *e*, admits of a diamond being used to a greater advantage than by any other known method.

In using this device the operator holds the stock *j* by the handle *r* and pushes it from him, which releases the point of the diamond from contact with the stone by the hooked finger O drawing back the diamond-handle *l*, The operator now draws the diamond-stock toward him, causing the hooked finger to release its hold of the diamond-handle, which allows the diamond point to touch the face of the stone by means of the pressure of spring *n*, thus making a cut or "crack" on its way back. This movement is repeated for every cut, the arm S moving in a parallel course during the operation. The parallel movement fo the arm is effected by turning the crank-plate R. The space turned of course regulates the space between each cut.

Sometimes it will be more convenient to operate the movement of the said arm by using the other hand. For such purpose a crank-plate is attached to the long shaft *w*.

The object of the screw and beveled-gear arrangement is for the purpose of obtaining a parallel movement of the arm S, and is used mainly for cracking the fine furrows between the principal and subordinate furrows by means of a diamond, as before explained. This parallel movement is of use in setting the arm S to any required draft when laying out the dress.

Sometimes it is required to have a slight concave surface on the face of the stone, commencing a short distance from the skirt and deepening toward the eye. To meet this requirement the arm S is provided with a setting-screw, *v*, Fig. 3, as stated, which impinges on the shoulder P′ of slide K, the said screw being regulated by the depth of the concavity. Fig. 3 explains this arrangement. 1 to 2 is a horizontal line, 3 to 4 the concavity, and 5 the elevation of the arm S from a horizontal line.

Again, it might be required to have the tool of the socket-slide *e* stand in an oblique position with respect to the horizontal surface of the stone in order to operate on the inclined sides of the deep furrow. To effect this the cross-plate G, which, as before stated, is attached to the circular plate F, can be turned in the direction of the arrows, (seen in Fig. 4,) so as to incline the tool, the clips *c* and *c′* being loosened for the purpose.

The arrangement for holding, guiding, and using the diamond is such that after the stock *j* is adjusted in the socket of the slide *e* so that the point touches the more elevated parts of the stone it can be secured firmly in its position so as to avoid the possibility of its touching the lower portions of the stone or dropping into holes. Should the diamond point, however, by mistake or chance, strike against an abrupt part—as the edge of a hole, for instance—the spring *n* would cause it to give way, the handle being pivoted to the stock, as explained.

The diamond will always move in a steady and direct line as it passes over the surface of the stone, the tension of the spring being just enough to keep it to its work and to yield laterally while making the cut.

Unlike the old method of staffing with the common long straight edge, which has frequently to lie on the whole diameter of the stone, this machine will accurately staff any one portion of the stone from its center, independent of its opposite portion. This is due to the rigid movement and exact level position of the arm over all parts of the surface.

Having fully described the nature, construction, and operation of this machine, what is claimed therein as new, and desired to be secured by Letters Patent, is—

1. The arm S, provided with a guide, T, of dovetail or other form, for a socket or tool-holding slide to work upon, for the purposes set forth.

2. In combination with the said arm, the shaft *w*, with its crank-plate *y*, beveled geared wheel *x′* U, the same being attached to and used in combination with the other parts of the machine, to wit: the slide K, cross-plate G, dovetailed guide H, screw-shaft I, nut O, beveled geared wheel N, and crank-plate R, said several parts connecting with the circular pivot-plate F, clips *c* and *c′*, sleeve D, double flange E, hollow journal A, branch feet B, set-screw *c″*, cap-plate *a*, screw-bolts *b*, and lever-nut *y*, the whole constructed and operating as described, and for the purpose specified.

3. The mode described for attaching the machine to the bed and runner-stones by means of the branched straps and grappling-arms secured as described, for the purpose set forth.

4. The tramming and staffing block I, with its shaft fitting into the socket-slide *e* on the guide T of arm S, substantially as and for the purpose set forth.

5. The means employed for raising and controlling the diamond when used in connection with a revolving arm, S, the means consisting of the stock *j*, diamond-handle *l*, spring *n*, finger *o*, lever *p*, and handle *r*, constructed and arranged substantially as shown and described.

6. Attaching the arm S with its guide T to the circular plate F, provided with a shoulder, T, when said parts are used in combination with the sleeve D and journal A, and all arranged substantially as and for the purpose set forth.

LEONARD ANDERSON.

Witnesses:

FRANK BLOCKLEY,

G. C. COTTON.